(12) United States Patent
Goodermuth et al.

(10) Patent No.: US 8,914,169 B2
(45) Date of Patent: Dec. 16, 2014

(54) SYSTEM, METHOD, AND COMPUTER SOFTWARE CODE FOR DISTRIBUTING AND MANAGING DATA FOR USE BY A PLURALITY OF SUBSYSTEMS ON A LOCOMOTIVE

(71) Applicant: General Electric Company, Schenectady, NY (US)

(72) Inventors: Todd Goodermuth, Satellite Beach, FL (US); Richard Hooker, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/655,719

(22) Filed: Oct. 19, 2012

(65) Prior Publication Data
US 2013/0041547 A1 Feb. 14, 2013

Related U.S. Application Data

(63) Continuation of application No. 12/538,608, filed on Aug. 18, 2009, now Pat. No. 8,295,998.

(60) Provisional application No. 61/177,257, filed on May 11, 2009.

(51) Int. Cl.
*G05D 1/02* (2006.01)
*G06F 9/54* (2006.01)
*B61L 15/00* (2006.01)

(52) U.S. Cl.
CPC .................................. *B61L 15/0072* (2013.01)

USPC ................ 701/19; 718/1; 718/100; 718/102; 718/103

(58) Field of Classification Search
USPC .................. 701/19, 20; 718/1, 100, 102, 103; 726/2, 6, 26, 30
See application file for complete search history.

(56) References Cited

U.S. PATENT DOCUMENTS

| | | | | |
|---|---|---|---|---|
| 4,582,280 | A * | 4/1986 | Nichols et al. | 246/182 R |
| 5,508,689 | A * | 4/1996 | Rado et al. | 340/3.1 |
| 6,397,129 | B1 * | 5/2002 | Lanoix et al. | 701/19 |
| 6,400,281 | B1 * | 6/2002 | Darby et al. | 340/933 |
| 6,401,015 | B1 * | 6/2002 | Stewart et al. | 701/19 |
| 7,269,482 | B1 * | 9/2007 | Shultz et al. | 701/1 |
| 7,395,141 | B1 * | 7/2008 | Seck et al. | 701/19 |
| 7,618,011 | B2 * | 11/2009 | Oleski et al. | 246/167 R |
| 8,280,566 | B2 * | 10/2012 | Foy et al. | 701/19 |
| 2003/0158638 | A1 * | 8/2003 | Yakes et al. | 701/22 |
| 2004/0122569 | A1 * | 6/2004 | Bidaud | 701/19 |
| 2004/0133319 | A1 * | 7/2004 | Pillar et al. | 701/29 |
| 2004/0236477 | A1 * | 11/2004 | Miyake et al. | 701/1 |
| 2004/0249533 | A1 * | 12/2004 | Wheals et al. | 701/36 |
| 2005/0102071 | A1 * | 5/2005 | Lapointe | 701/19 |
| 2006/0195327 | A1 * | 8/2006 | Kumar et al. | 705/1 |

(Continued)

*Primary Examiner* — Thomas G Black
*Assistant Examiner* — Sara Nelson
(74) *Attorney, Agent, or Firm* — GE Global Patent Operation; John A. Kramer (57) ABSTRACT

A communication system for controlling sharing of data across a plurality of subsystems on a locomotive, the communication system including an open defined interface unit configured so that a plurality of applications may access locomotive control system data in a common defined manner with predictable results.

5 Claims, 4 Drawing Sheets

(56) References Cited

U.S. PATENT DOCUMENTS

| | | | |
|---|---|---|---|
| 2007/0219666 A1* | 9/2007 | Filippov et al. | 700/245 |
| 2008/0190680 A1* | 8/2008 | Kaneko et al. | 180/170 |
| 2008/0281477 A1* | 11/2008 | Hawthorne et al. | 701/19 |
| 2009/0201139 A1* | 8/2009 | Zimmermann et al. | 340/426.13 |
| 2010/0063656 A1* | 3/2010 | Knott et al. | 701/19 |
| 2010/0073158 A1* | 3/2010 | Uesaka et al. | 340/450.2 |
| 2010/0217462 A1* | 8/2010 | Shaffer et al. | 701/19 |
| 2011/0093144 A1* | 4/2011 | Goodermuth et al. | 701/20 |

* cited by examiner

SYSTEM, METHOD, AND COMPUTER SOFTWARE CODE FOR DISTRIBUTING AND MANAGING DATA FOR USE BY A PLURALITY OF SUBSYSTEMS ON A LOCOMOTIVE

CROSS-REFERENCE TO RELATED APPLICATIONS

This application claims priority to and is a Continuation of U.S. application Ser. No. 12/538,608, "System, Method, and Computer Software Code for Distributing and Managing Data for Use by a Plurality of Subsystems on a Locomotive," filed Aug. 10, 2009, which claims priority to U.S. Provisional Application No. 61/177,257, filed May 11, 2009, all of which are incorporated herein by reference in their entirety.

BACKGROUND

Aspects of the present disclosure relate generally to communication systems and, more particularly, to providing a common communication and physical interface for data distribution across a plurality of subsystems on a locomotive.

A railroad locomotive supplies motive power (traction) to move the locomotive and a load (e.g., non-powered railcars and their contents), and applies brakes on the locomotive and/or on the non-powered railcars to slow or stop the train. The motive power is supplied by electric traction motors responsive to an AC or DC power signal generated by the locomotive engine.

In addition to the system producing motive power, there are a plurality of other subsystems that are part of a locomotive that perform different functions, such as, but not limited to, distributed power remote control applications, energy management applications, train control applications, train management system applications, display and event recorder applications, brake control system applications, etc. Other subsystems, to better improve the performance, are continuously being supplied for use with or in locomotives.

Currently, a communication management unit (CMU) is used to communicate information off-board and onboard the locomotive through an antenna. Though minor functions of the subsystems identified above may use a processor that is part of the CMU in performing certain subsystem specific tasks, the CMU is unable to communicate information provided from one subsystem between the other subsystems. Furthermore, no system/process currently exists to allow for seamless integration of subsystems in a locomotive where information between the subsystems may be shared to provide for more efficient operation of each subsystem individually and collectively. Therefore, locomotive operators and owners would benefit from a standard interface for accessing data associated with control of the locomotive and other onboard subsystems where data specific to each subsystem is made available to the other subsystems in the locomotive.

BRIEF DESCRIPTION

Embodiments of the present inventive subject matter relate to a system, method, and computer software code for controlling sharing of data across a plurality of subsystems on a locomotive. The system is a communication system that comprises an open defined interface unit configured so that a plurality of applications may access locomotive control system data in a common defined manner with predictable results. Thus, in one aspect, "open defined interface" refers to an interface between systems/subsystems in a locomotive (as effectuated by the interface unit) for the exchange of locomotive control system data and/or other data, which is open for access by a plurality of applications in a common, defined manner.

The method comprises autonomously managing a transmission of data from a locomotive control system to a plurality of applications, between the plurality of applications, from a sensor to one or more of the plurality of applications, from a communication management unit to the plurality of applications, and/or from off-board the locomotive to the plurality of applications. The method further comprises autonomously managing a transmission of data received from the plurality of applications to determine which application data is provided to the locomotive control system. The method further comprises operating the locomotive based on the application data provided to the locomotive control system.

The computer software code is stored on a computer readable medium and configured for execution with a processor designated for operating a locomotive. The computer software code comprises a computer software module for autonomously managing a transmission of data from a locomotive control system to a plurality of applications, between the plurality of applications, from a sensor to a plurality of applications, from a communication management unit to the plurality of applications, and/or from off-board the locomotive to the plurality of applications. The computer software code further comprises a computer software module for autonomously managing a transmission of data received from the plurality of applications to determine which application data is provided to the locomotive control system. The computer software code also comprises a computer software module for operating the locomotive based on the application data provided to the locomotive control system.

BRIEF DESCRIPTION OF THE DRAWINGS

A more particular description of the inventive subject matter briefly described above will be rendered by reference to specific embodiments thereof that are illustrated in the appended drawings. Understanding that these drawings depict only typical embodiments of the inventive subject matter and are not therefore to be considered to be limiting of its scope, the embodiments of the inventive subject matter will be described and explained with additional specificity and detail through the use of the accompanying drawings in which.

DETAILED DESCRIPTION

Reference will be made below in detail to exemplary embodiments of the inventive subject matter, examples of which are illustrated in the accompanying drawings. Wherever possible, the same reference numerals used throughout the drawings refer to the same or like parts.

Exemplary embodiments of the inventive subject matter solve problems in the art by providing a method, system, and computer implemented method, such as a computer software code or computer readable media, for providing an open defined interface so that any application may access locomotive control system data in a common defined manner with predictable results.

Persons skilled in the art will recognize that an apparatus, such as a data processing system, including a CPU, memory, I/O, program storage, a connecting bus, and other appropriate components, could be programmed or otherwise designed to facilitate the practice of the method of the inventive subject matter. Such a system would include appropriate program means for executing the method of the inventive subject matter.

Also, an article of manufacture, such as a pre-recorded disk, computer readable media, or other similar computer program product, for use with a data processing system, could include a storage medium and program means recorded thereon for directing the data processing system to facilitate the practice of the method of the inventive subject matter. Such apparatus and articles of manufacture also fall within the spirit and scope of the inventive subject matter.

Broadly speaking, a technical effect is to provide an open defined interface so that any application may access locomotive control system data in a common defined manner with predictable results, for more efficient and better operation (possibly including autonomous operation) of a locomotive. To facilitate an understanding of the exemplary embodiments of the inventive subject matter, it is described hereinafter with reference to specific implementations thereof. Exemplary embodiments of the inventive subject matter may be described in the general context of computer-executable instructions, such as program modules, being executed by any device, such as but not limited to a computer, designed to accept data, perform prescribed mathematical and/or logical operations usually at high speed, where results of such operations may or may not be displayed. Generally, program modules include routines, programs, objects, components, data structures, etc. that performs particular tasks or implement particular abstract data types. For example, the software programs that underlie exemplary embodiments of the inventive subject matter can be coded in different programming languages, for use with different devices, or platforms. It will be appreciated, however, that the principles that underlie exemplary embodiments of the inventive subject matter can be implemented with other types of computer software technologies as well.

Moreover, those skilled in the art will appreciate that exemplary embodiments of the inventive subject matter may be practiced with other computer system configurations, multi-processor systems, microprocessor-based or programmable consumer electronics, minicomputers, mainframe computers, and the like. Exemplary embodiments of the inventive subject matter may also be practiced in distributed computing environments where tasks are performed by remote processing devices that are linked through at least one communications network. In a distributed computing environment, program modules may be located in both local and remote computer storage media including memory storage devices.

Referring now to the drawings, embodiments of the present inventive subject matter will be described. Exemplary embodiments of the inventive subject matter can be implemented in numerous ways, including as a system (including a computer processing system), a method (including a computerized method), an apparatus, a computer readable medium, a computer program product, or a data structure tangibly fixed in a computer readable memory. Several embodiments of the inventive subject matter are discussed below.

Figure 1:
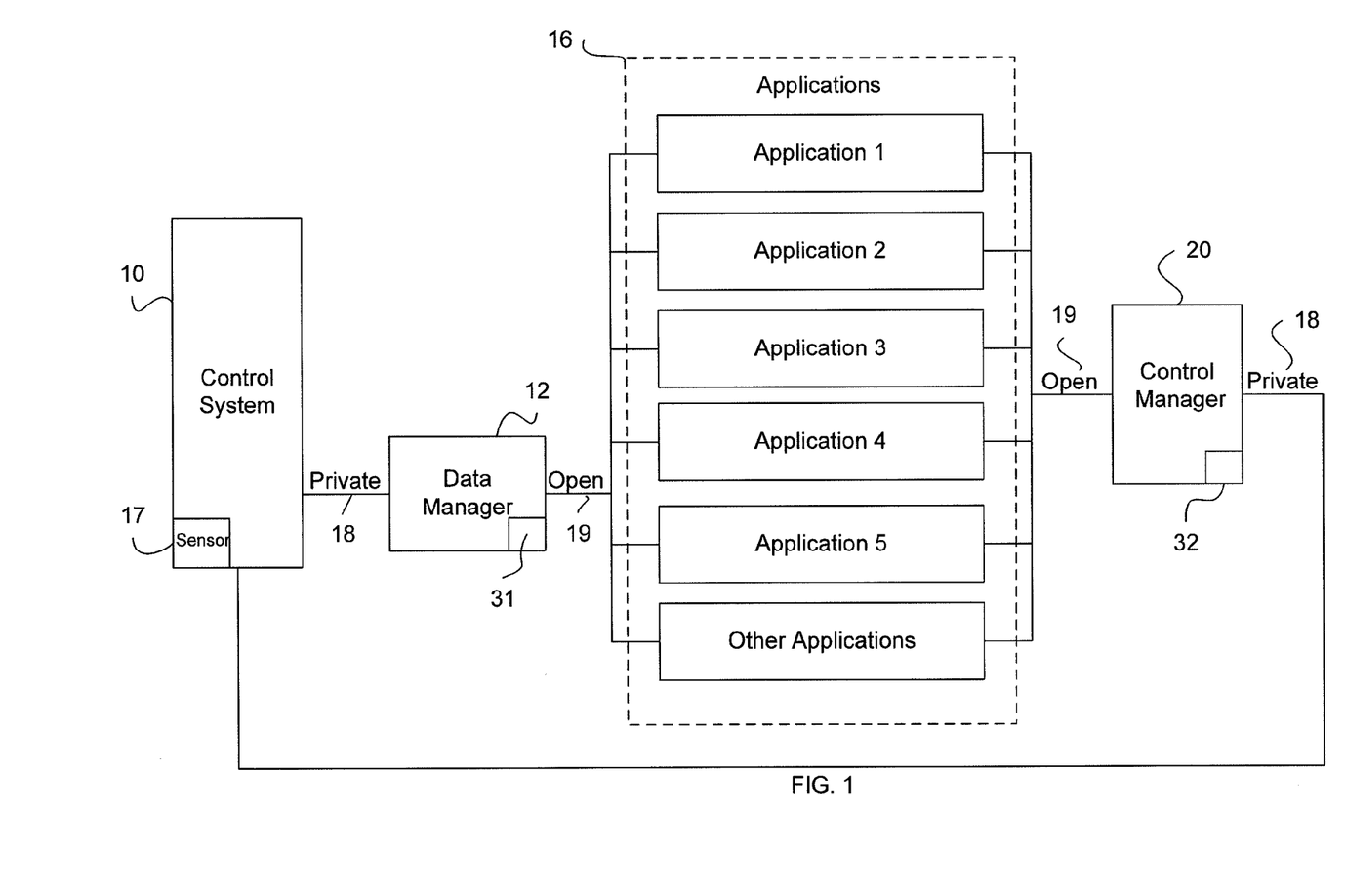
FIG. 1 is a block diagram illustrating an exemplary embodiment for distribution of data between a locomotive control system and locomotive subsystems.
Figure 3:
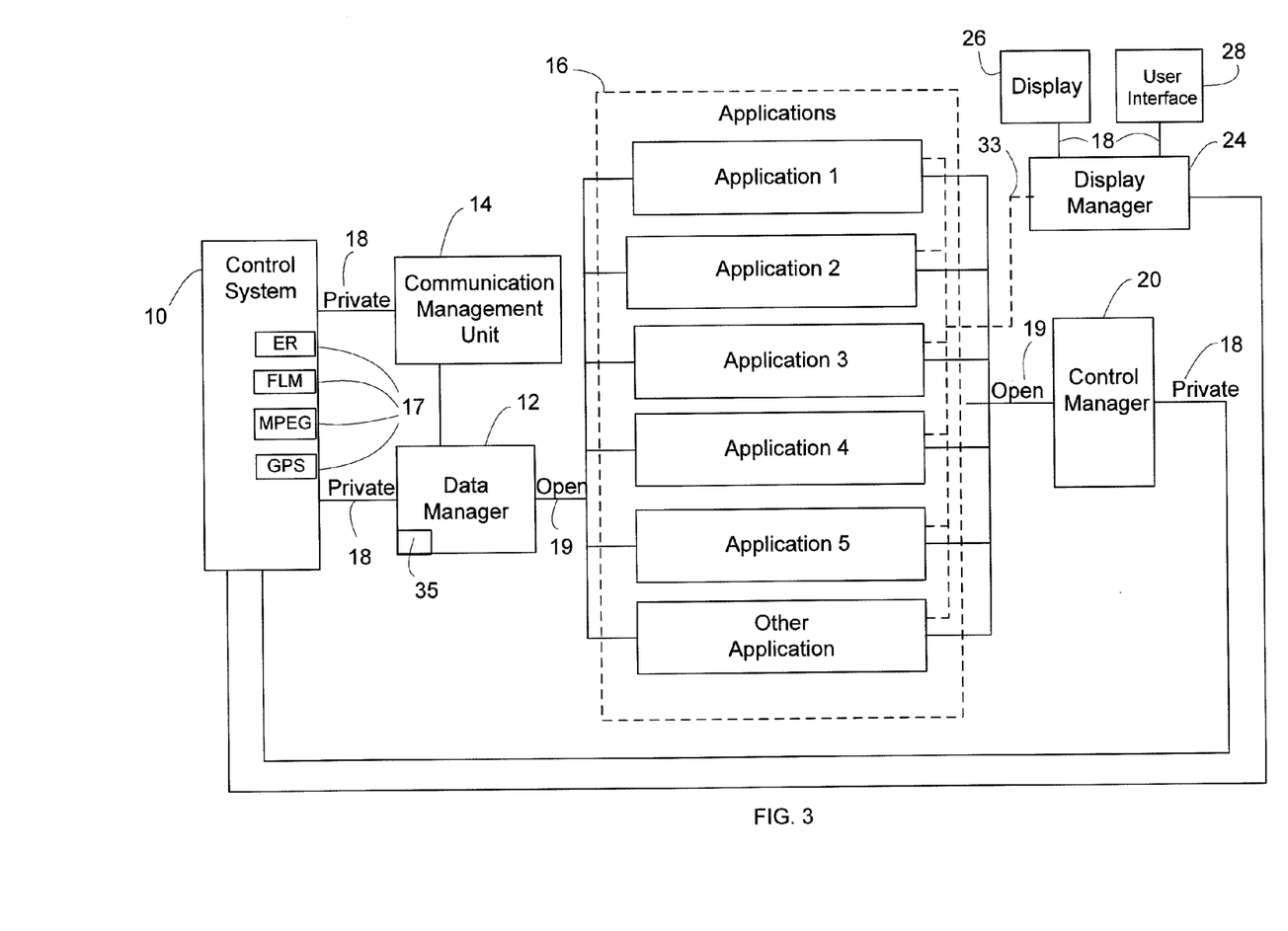
FIG. 3 is a block diagram illustrating an exemplary embodiment for distribution of data between a locomotive control system, locomotive subsystems, and an interface with an operator.

FIG. 1 is block diagram illustrating distribution of data between a control system and applications. The applications 16 are in communication with a data management unit, data distribution unit, or data manager 12. The terms "data management unit," "data distribution unit," and "data manager" are interchangeable terms since such units are configured to manage a distribution of data. The underlying embodiment is an open defined interface so that any application may access locomotive control system data in a common defined manner with predictable results. For example, certain subsystems may be considered source applications while other applications may be considered service applications, where a service application may request data from either a source application or another service application, and a source application may request data from either a service application or another source application. (Source and service applications are described in more detail below.) In one exemplary embodiment, a common communication standard may utilize shared memory, such as provided with a communication management unit (CMU) as illustrated in FIG. 3, or in another embodiment as provided with an independent data management unit, or data distribution unit, as illustrated in FIG. 1. The communication may include requests between service applications and source applications, and/or transfer of data associated with maintaining and/or operating the locomotive.

For example, Application 1 of the plurality of applications 16 may be notified depending on whether other service applications and/or source applications are functioning or are not functioning. Once an application is functioning (more specifically, once an application is recognized through the communication standard), information from that application is identified to the other applications, and information from the now recognized application is available to the other applications. Thus, information from the other applications may be used by Application 1 as Application 1 performs the intended function of Application 1.

In an exemplary embodiment, the communication requests may be accomplished with a "publish" and "subscribe" concept. The source applications are considered publishers, which declare to send and then publish data available by or from the source application. The service applications are considered subscribers, which declare (request) to receive data and where the data requested is autonomously delivered. Some applications may be both source applications and service applications. The term "autonomous" is defined as being able to perform an intended function with none to minimum operator (e.g., human operator of a locomotive) input.

The communication requests are communicated through a communication standard, as implemented on or as part of one or more system components, e.g., the data manager 12 or otherwise. An example of a communication standard is a data-distribution service for real-time systems (DDS) standard. The DDS standard is a middleware standard that directly addresses publish-subscribe communications for real-time and embedded systems. The DDS standard provides for a virtual global data space where applications 16 can share information by simply reading and writing data-objects addressed by means of an application-defined name, or topic, and/or a key that is unique to a specific application. Use of the DDS standard provides for extensive control of quality of service parameters, such as but not limited to reliability, bandwidth, delivery deadlines, and resource limits. Thus, the communications between the service applications and source applications are able to provide for one-to-many data transfers, many-to-one data transfers, many-to-many data transfers, topic-based data transfer, and/or multi-rate message transfer.

In another exemplary embodiment, a data dictionary is provided which defines all data available from a control manager 20, described in further detail below. The data dictionary may be unique to each type of locomotive. The sort of information contained within the data dictionary may include, but is not limited to, specified frequencies at which data is delivered. For example, some data may be provided at 1 Hertz (Hz), while other data is provided at 10 Hz, and still other data is provided at 0.2 Hz. A data dictionary may also be provided that defines data available to at least one of the plurality of applications and/or a command request available from the control manager unit. The data is provided based on a relative priority of the applications, after validating the authority of the application to receive the requested data. The data manager 12 maintains the authority level of each application to receive certain classes of data and the relative application priority of the application.

Though the term "source application" and "service application" are used above, each of these terms may be used interchangeably with respect to how a certain application is being used at any given time. Therefore, for simplicity, "application" will be used instead of these more specific terms.

The data manager 12 may be a standard locomotive standard integration ("LSI") box or hardware with appropriate processor and software applications. The data manager 12 allows for the applications 16 to request and be supplied with data where the data may be from the data manager 12, sensors 17, information from off-board the locomotive (such as but not limited to information from a remote track database), and/or data from other applications 16. To perform this function, the data manager 12, a control system 10 of the locomotive, and each application 16 are in communication directly or indirectly. All of the communication functions of the data manager 12 may be performed through a finite sequence of instructions, an explicit, step-by-step procedure for solving a problem, or an algorithm, that performs functions of the procedure or algorithm in a processor 31 that is a part of the data manager 12.

Any one of the on-board applications 16 can request data. Data would then be provided at a specific frequency, as provided by the control system 10 and the data manager 12. In an exemplary embodiment, the specific data and frequency available are published so that application designers can design applications 16 to operate within these limitations. The data manager 12 may also be configured to include distribution of dynamic wayside data that may include, but is not limited to, data associated with signal aspect, switch position, crossing gate position, etc.

Information, or data, is provided from the control system 10, through the data manager 12 to the applications 16. The communication connection between the data manager 12 and the control system 10 is through a private interface 18. All of the interfaces 18, 19 disclosed herein may be Ethernet based. Having the private interface 18 means that communications between the control system 10 and any other devices are limited, e.g., with a proprietary connection protocol, to ensure that the other devices are designed to communicate with the control system 10 so as not to interfere with the operation of the control system 10. For example, if an attempt is made to bypass the data manager 12 and connect an application 16 directly to the control system 10, such a bypass attempt would not be possible without knowing the proprietary connection protocol.

The communication connection between the data manager 12 and the applications 16 is an open interface 19. Having an open interface 19 means that other devices and/or applications may be connected through the open interface 19, wherein once connected the connection protocol allows for the transmission of data or information through the open interface 19. The open interface 19 also provides for a uniform, possibly even simplified interface.

As disclosed above, the type of data that can be provided to the applications 16 is not limited to data gathered from the control system 10. The track data that may be provided from off-board the locomotive may be provided through the data manager from an external source. The data may be received via an 802.11 wireless local area network to reduce the cost, or in-route as necessary via a satellite/cell phone and then communicated to the data manager 12, such as may be available via a CMU or a mobile access router. Additionally, prime directive data (track authorities and speed restrictions) data may also be provided through the data manager 12.

An example of sensor data that is provided may include common global positioning system ("GPS") data, wheel speed data, fuel consumption, etc. By using the data manager 12 to provide sensor data to applications 16, sensor replication aboard the locomotive is not required. Since sensors 17 are part of the locomotive, and are likely to be used within the control system 10, data from the sensors 17 may be provided through the private interface 18 connecting the data manager 12 to the control system 10. Though only one sensor 17 is illustrated, this single sensor is representative of any number of sensors 17. Additionally, though the sensor 17 is illustrated as being a subset of the control system 10, the sensor 17 may be an independent element, having its own interface, either a private interface 18 or an open interface 19. As disclosed in FIG. 3, other types of sensors are illustrated where the sensors may be considered source applications.

Additionally, the data manager 12 may be configured to solve application data distribution issues. For example, if two applications 16 are requiring data at the same time where bandwidth is not available for delivery of the data to both of the applications simultaneously, the data manager 12 will schedule delivery of the data. The delivery of the data may be based on any number of factors including, but not limited to, priority, bandwidth, duration, vitality, etc. The data manager 12 may also be used to solve data currency issues.

In operation, the applications 16 are able to register and/or communicate their data needs with the data manager 12. For example, Application 1 may require track data at a certain rate, such as but not limited to a given distance ahead of a current location. The data manager 12 is also able to collect data from other applications, and/or the control system, and provide Application 1 the data required, without impacting the source application. Thus, the data manager 12 provides sharing of data between applications 16 without impact to any of the applications 16. Additionally, point-to-point interface definitions, which may be costly, between the applications 16, and/or the control system 10 are no longer needed since a common interface is provided through the data manager 12.

Figure 2:
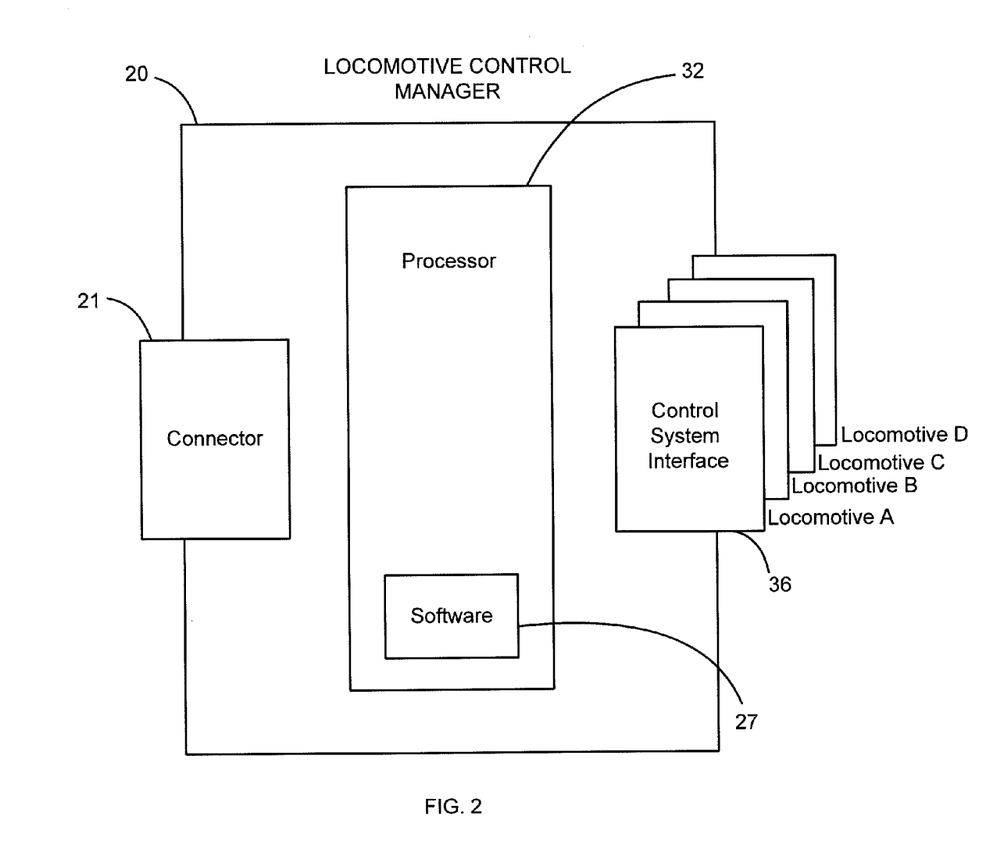
FIG. 2 is an exploded view of a control manager.

A common interface is used to provide information from the applications 16 to the control system 10. The common interface is identified as the locomotive control manager unit 20, or locomotive control manager, and the common interface is a single integration point for all applications 16 that want to provide control input to the locomotive. The "control input" may be data (e.g., data to be provided to the control system 10; some such data, originating from the applications 16, is referred to herein as "application data") and/or a command request, e.g., a request that the control system act upon a particular command. As illustrated in FIG. 2, elements of the control manager 20 may include, but are not limited to, a connector 21 for the open interface 19 to receive control requests from the applications 16, a processor 32 that has an algorithm/software 27 which is operable within the processor 32 to perform the functions discussed below, and a connector or other control system interface 36 specific to the control system 10 for a specific type of locomotive, as illustrated by "Locomotive A," "Locomotive B," "Locomotive C," and "Locomotive D." Examples of different specific types of locomotives include an EMD SD70™ locomotive, a General Electric (GE) Dash 9™ locomotive, a GE AC4400™ locomotive, and/or a GE Evolution™ series locomotive. The data manager 12 also is equipped with a similar connector 21 for the open interface, a processor 31 in which an algorithm may operate, and a connector for the private interface 18.

The interface between the applications 16 and the control manager 20, or receiving interface, is an open interface 19, which provides a common interface for the applications 16 to access the locomotive control system 10. The interface between the control manager 20 and the control system 10 is a private interface 18. Aspects of the control system 10 that are accessible and controlled include, but are not limited to, throttle or notch control, dynamic brake control, automatic airbrake control, wireless distributed power, wired distributed power, independent brake control or operation, etc. The control manager 20 is able to authorize and prioritize to avoid an undesired state or conflict for controlling data (and other control input) provided from the applications 16 to the locomotive control system 10 that is able to de-conflict any conflicting input from on-board diverse applications like a train control application or an energy management application.

In operation, the control manager 20 processes control input received from the plurality of applications 16, for providing to the control system 10 or otherwise. For example, the control manager 20 may receive application data from the applications 16 (or other data) and process the data for selectively providing the data to the control system, e.g., for determining which application data is provided to the locomotive control system. (For example, data may only be provided based upon the needs or requests of the control system 10, or that certain data is only provided depending on the operational state of the control system and/or locomotive generally.) In another example, the control manager 20 may receive command requests from the plurality of applications 16 and determine which of the received command requests is provided to the control system for use in operating the locomotive. This determination may be based on time factors (when the command requests are received, and the timeliness of the command requests), a priority hierarchy among types of different command requests, the relationship between a particular command request and the current operational mode of the locomotive (e.g., certain requests may only be applicable when the locomotive is in a particular mode of operation), the relation between a particular command request and other command requests received either before or after the command request (e.g., one command request may be moot in light of a previously recently received command), etc. In another aspect, the control manager 20 is able to resolve conflicts between the applications 16 and between control input received from the applications. For example, if a locomotive is equipped with an energy management application and a train control application, and if the train control application does not have the appropriate movement authority to transition the locomotive over a piece of track, or within a certain territory, the control manager 20 may call for a stop (stop command request) via the train automatic brake application. At the same time, the energy management application may not be aware that the train is not authorized to proceed and may call for notch 6 (throttle command request) over a given territory. The control manager 20 would be able to resolve the conflict by using data from one or more other applications 16 and/or based on a priority that is preset within the control manager 20 that establishes application priority. The control manager 20 is also able to override and/or isolate an application that is malfunctioning. As disclosed above, the control manager 20 also provides for safe interlocks among the controls. Additionally, as disclosed in further detail below, the control manager 20 is able to receive inputs from an operator, which is sent to the control system 10 for implementation. These manual inputs also have to be de-conflicted with requesting applications.

In one embodiment, the data that is being passed from the control system 10 through the data manager 12 and control manager 20 and to the applications 16 is real-time data. Thus, the implementation of controlling the system is accomplished with current data. As further illustrated in FIGS. 1 and 3, a system and/or process are provided. By having a closed loop control system/process, control of the locomotive may be autonomously performed, where inputs from an application, such as, but not limited to, an energy management application and/or a train control application, determines a speed to operate over a route based on the train consist and terrain, and the control manager 20 operates the throttle and brake in accordance with the inputs. More specifically, the control manager 20 autonomously provides directions, or commands, to the locomotive control system 10, which in turn commands the throttle (e.g., notch setting), dynamic brake, automatic train air brake, independent brake, and direction of travel of the locomotive. Hence, the locomotive is able to operate in an "autopilot" mode. Examples of the energy management application and a variation of the control manager 20 are disclosed in trip/mission optimizer patent applications assigned to the Assignee of the present inventive subject matter, such as U.S. Publication Nos. 2008/0082223, 2007/0219683 and 2007/0219680 (see, for example, U.S. Publication No. 2007-0219680-A1 dated Sep. 20, 2007). The closed loop control system includes at least one application 16, the control system 10, and the control manager 20. The closed loop control system may also include the data manager 12. (The closed loop control system, in any of the embodiments herein, can be characterized by the operation of the locomotive being regulated by, or otherwise based on, feedback regarding the operation and operational performance of the locomotive, e.g., the locomotive is operated based both on control input and on sensed feedback of one or more operational characteristics of the locomotive, such as actual speed, actual direction, acceleration, sensed location, and the like.)

FIG. 3 is block diagram illustrating distribution of data between a control system and applications also with a display manager unit, or display manager 24. The display manager 24 is used to decide which data is communicated to an operator onboard the locomotive. At least one common display 26 is also provided. A plurality of common displays may be provided. When the operator desires information specific to a certain application and/or an operating aspect of the control system 10 and/or locomotive, the operator is able to select that application 16 and/or the operating aspect of the control system 10 and/or locomotive.

The terms "display manager" and "display" are terms not meant to be limited to providing only data visually to the operator. The display manager may provide a flow, or transmission, of data made available to an operator as visual data, tactile data, and/or audio data. Therefore, the display may be a device that provides the information to the operator in the intended form identified, such as but not limited to visually, through touch, and/or audible. The terms "flow" or "transmission" are not meant to be limiting. These terms are used to include for a distribution of data between two locations, such as but not limited to units, applications, and/or devices.

The display manager 24 is connected directly to the applications 16 through a negotiated interface 33, or more specifically an interface that is defined specific for a purpose of each application. The interface between the display 26, user interface 28, and display manager 24 may also be a private interface.

FIG. 3 also illustrates the data manager 12 being connected to a communication management unit ("CMU") 14. Thus, in implementation, instead of the functionality of the CMU 14 being integrated within a single data manager unit, a data manager unit may be connected to an existing CMU 14. The CMU 14 is also in communication with the locomotive control system 10 using its own private interface 18. The connection between the data manager 12 and the CMU 14 may be either a private interface 18 or an open interface 19. The data passed from the CMU 14 to the data manager 12 is data needed by the applications 16, and is generally information that the CMU 14 received from sources that are remote from the locomotive.

A file management staging unit ("FMS") 35 may be part of the data manager 12. The FMS 35 is provided to receive and distribute application replacement/updates for the applications and/or sensors, where the sensors are considered source applications. As illustrated, examples of such source applications include, but are not limited to GPS, Movie Picture Expert Group ("MPEG") encoder, fuel ("FLM") indicator, event recorder ("ER"), etc. The replacement/updates may be provided from an external source from the locomotive, where the data is communicated through the CMU 14, or as illustrated in FIG. 1 though the data manager 12, which includes CMU-like functionality.

The representations of the applications 16 in FIGS. 1 and 3 as blocks are provided to represent that each application performs a unique function. In operation, each application may have its own hardware and software components, or instead of each application having its own hardware, each application (or software, or algorithm) is housed within hardware where all hardware has a common bus and/or a common housing where common processors are used. Servers may be provided, where multiple applications are stored in each server. Instead of allowing any application to reside on any server, the importance of the application may determine which server is installed within. For example, a non-vital server may be used for non-vital applications while a vital server may be used for vital applications. In such a configuration, the vital server may have more redundancy than the non-vital server. Additionally, when multiple servers are used (either hosting an individual application per server or applications grouped together on designated servers), the servers and hence the applications, may use multicasting, or multicast delivery, to publish data. Those skilled in the art will readily recognize that "multicast," or "multicasting," refers to using a network technology for the delivery of data, or information, to a group of destinations simultaneously using the most efficient strategy to deliver the messages over each link of the network only once, creating copies only when links to the multiple destinations split.

Although the control manager 20 is illustrated in FIGS. 1 and 3 as being separate from the control system 10, the control manager 20 may be a part of the control system 10, such as integrated directly into the control system 10. The data manager 12 may be a part of the CMU 14, more specifically hosted within existing CMU chassis and/or processor. Additionally, the interfaces 18, 19 may be part of a router to communicate data from the data manager 12 to the applications 16 and from the applications 16 to the control manager 20. Similarly, even though the data manager 12 and control manager 20 are displayed as being two separate units, those skilled in the art will recognize that these units may be a single unit, and/or within a common housing. Thus, the data manager 12 and control manager 20 within the common housing (or even as separate units) may be considered an open defined interface unit. Toward this end, the processor 31 that is part of the data manager 12 and the processor 32 that is part of the control manager 20 may be a single processor. Illustrating all of the units as blocks in FIGS. 1 and 3 is done solely to illustrate functionality of the various units/elements disclosed herein, and should not be considered limiting with respect to packaging.

Figure 4:
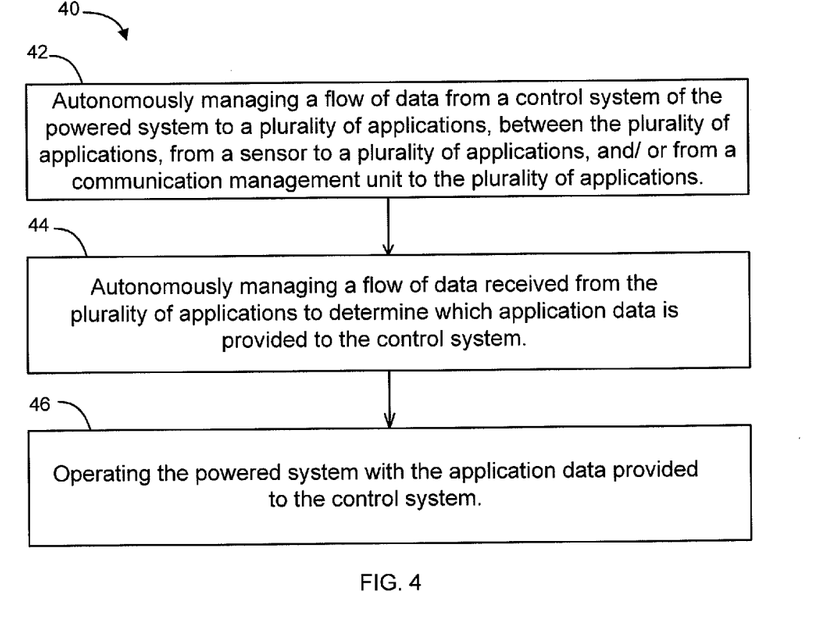
FIG. 4 is a flowchart illustrating an exemplary embodiment of a method for distribution of data between a locomotive control system and locomotive subsystems.

FIG. 4 is a flowchart 40 of a method for operating a locomotive. The flowchart 40 illustrates autonomously managing a flow of data from a control system of the locomotive to a plurality of applications, between the plurality of applications, from a sensor to the plurality of applications (or to other applications), and/or from a communication management unit to the plurality of applications, at 42. The flowchart further illustrates autonomously managing a flow of data received from the plurality of applications to determine which application data is provided to the control system, at 44. The locomotive is operated with the application data provided to the control system, at 46. As discussed above, operating the locomotive may further include autonomously operating the locomotive by autonomously implementing changes to direction of travel, changes to notch/throttle or speed, and/or dynamic braking and air brake operation. Additionally, autonomously managing the flow of data from the locomotive control system, at 42, may further include distributing data to the plurality of applications based on an authority and/or priority for distributing data.

The method shown in the flowchart 40 may be performed with a computer software code having computer software modules where the computer software code is stored on a computer media and is executed with a processor. Thus, each process flow in the flowchart 40 is performed by a computer software module specific to the process contained in a specific process. For example, autonomously managing a flow of data from a control system of the locomotive to a plurality of applications, between the plurality of applications, from a sensor to the plurality of applications (or to other applications), and/or from a communication management unit to the plurality of applications, at 42, is performed by a computer software module for autonomously managing a flow of data from a control system of the locomotive to a plurality of applications, between the plurality of applications, from a sensor to the plurality of applications, and/or from a communication management unit to the plurality of applications.

As discussed above, one embodiment of the present inventive subject matter relates to a communication system (different embodiments shown generally in FIGS. 1 and 3) for controlling sharing of data across a plurality of subsystems on a locomotive. In one embodiment, the communication system comprises an open defined interface unit, which establishes an interface between the locomotive subsystems for the exchange of locomotive control system data and/or other data. The interface is open for access by a plurality of applications in a common, defined manner. The "other" data may be data that is used by the subsystems/applications apart from the locomotive control system; examples include: communication data to be transmitted off-board, but that does not originate with the control system, e.g., operator or voice dispatch communications; communications data received from off-board the locomotive that is not used for control purposes; data that is generated and/or stored for archival purposes; certain time data, location data, train/locomotive data, etc.; and the like.

In one embodiment, the open defined interface unit comprises, at least functionally speaking, a data manager 12 for managing data, as described above. In another embodiment, the open defined interface unit comprises, at least functionally, a control manager 20 for managing control input, as described above. In another embodiment, the open defined interface unit comprises, at least functionally, a data manager 12 for managing data (e.g., in the manner described above) and a control manager 20 for managing control input (e.g., in the manner described above). In one embodiment, the data manager 12 and control manager 20 are integrated into a single electronic unit, for systems simplification and/or efficiency purposes. In another embodiment, the data manager 12 and control manager 20 are separate electronic units that are housed in a common housing, for conserving space while providing interconnection and/or systems flexibility, e.g., in terms of how the data manager 12 and control manager 20 are connected and what the data manager 12 and control manager 20 are connected to. In another embodiment, the data manager 12 and control manager 20 are separate electronic units that are housed in different housings, for providing a greater degree of flexibility in terms of system positioning and interconnection, e.g., the data manager 12 and control manager 20 can be positioned in different locations, for more flexibility in terms of what components/elements/subsystems in the locomotive the data manager 12 and the control manager 20 are connected to. In another embodiment, one or both of the data manager 12 or the control manager 20 are functionally implemented in an existing electronic subsystem of the locomotive (either the same electronic subsystem or in different subsystems), for system efficiency and ease of implementation.

Another embodiment relates to a communication system on a locomotive. The communication system comprises a data manager unit and a control manager unit. The data manager unit is configured to manage a transmission of data from a control system of the locomotive to a plurality of applications, between the plurality of applications, from a sensor to one or more of the plurality of applications, and from a communication management unit to the plurality of applications. The data manager unit is configured as an open defined interface, for the plurality of applications to access locomotive control system data in a common defined manner, as described in more detail above. The control manager unit is configured to receive control input from the plurality of applications and process the control input for providing to the control system for use in operating the locomotive. For example, the control manager unit may process application data (or other data) and/or command requests in a manner as described above. The communication system further comprises a private interface for communications between the data manager unit and the control system and/or between the control manager unit and the control system, and an open interface for communications between the data manager unit and the plurality of applications and for communications between the control manager unit and the plurality of applications. In another embodiment, the data manager unit is configured to manage the transmission of data, at least between the plurality of applications, based on a publish-subscribe communications structure ("structure" referring to a configuration or setup, using program instructions, electronics, other control mechanism, or otherwise, for implementing publish-subscribe communications in the data manager unit and/or system generally).

As should be appreciated, a modern locomotive is an electro-mechanical system that comprises a plurality of mechanical, electrical, and electro-mechanical subsystems. An "application," as used herein, is a locomotive subsystem or portion thereof that utilizes data, provides data, and/or that provides or utilizes control input. An application may be a processor or processor-based unit, an algorithm or software as executed by a processor or processor-based unit, or the like, but is not limited in this regard unless otherwise specified. For example, an application may be a hardware (e.g., electronics)-based subsystem or portion thereof, an electro-mechanical subsystem or portion thereof, or the like. In one embodiment, all or at least some of the applications are embodied as algorithms/software/programming instructions as executed by a processor or processor-based unit, e.g., for carrying out distributed power operations, other train control operations, on-board and off-board communications operations, emissions control and other engine control operations, data capture and storage operations, operator interface operations, and the like.

Though exemplary embodiments of the present inventive subject matter are described with respect to locomotives, exemplary embodiments of the inventive subject matter are also applicable for use with other powered systems, such as but not limited to marine vessels, stationary units such as power plants, off-highway vehicles, agricultural vehicles, and/or mass cargo or mass transit transportation vehicles, each which may use at least one engine. Toward this end, when discussing a specified mission, this includes a task or requirement to be performed by the powered system. Therefore, with respect to a railway vehicle, marine vessel, agricultural vehicle, mass cargo or mass transit transportation vehicle, or off-highway vehicle applications, this may refer to the movement of a collective powered system (where more than one individual powered system is provided) from a present location to a destination. In the case of stationary applications, such as but not limited to a stationary power generating station or network of power generating stations, a specified mission may refer to an amount of wattage (e.g., MW/hr) or other parameter or requirement to be satisfied by the powered system.

While the inventive subject matter has been described with reference to various exemplary embodiments, it will be understood by those of ordinary skill in the art that various changes, omissions and/or additions may be made and equivalents may be substituted for elements thereof without departing from the spirit and scope of the inventive subject matter. In addition, many modifications may be made to adapt a particular situation or material to the teachings of the inventive subject matter without departing from the scope thereof. Therefore, it is intended that the inventive subject matter not be limited to the particular embodiment disclosed as the best mode contemplated for carrying out this inventive subject matter, but that the inventive subject matter will include all embodiments falling within the scope of the appended claims. Moreover, unless specifically stated any use of the terms first, second, etc. do not denote any order or importance, but rather the terms first, second, etc. are used to distinguish one element from another.

The invention claimed is:

1. A communication system comprising:
a control manager unit configured to be disposed onboard a rail vehicle and to receive control input comprising at least one of application data or command requests from a plurality of applications and process the control input to provide at least a portion of the control input to a control system of the rail vehicle configured for use in operating the rail vehicle, the control manager unit configured to selectively determine which portions of the control input received from the plurality of applications are provided to the control system;

a private interface configured to communicably couple the control manager unit to the control system of the rail vehicle, the private interface configured to limit communication with the control system via a connection protocol, wherein the connection protocol is configured to prevent direct communication between the control manager unit and an application that does not use the connection protocol; and an open interface configured to communicably couple the control manager unit and the plurality of applications.

2. The communication system of claim 1, wherein the control manager unit comprises a closed loop control system that further comprises the control system and at least one of the applications.

3. The communication system of claim 2, wherein the closed loop control system is configured to provide autonomous operation of the rail vehicle.

4. The communication system of claim 1, wherein the control manager unit is configured to receive command requests from the plurality of applications and determine which of the command requests is provided to the control system for use in operating the rail vehicle, wherein the command requests request the control system to act upon one or more commands.

5. The communication system of claim 4, wherein the control manager unit is configured to determine which of the command requests is provided to the control system for use in operating the rail vehicle based on at least one of when the command requests are received, a timeliness of the command requests, a priority hierarchy among types of different command requests, or a relationship between one of the command requests and at least one of a current operational mode of the rail vehicle or other command requests received at least one of before or after said one of the command requests.

* * * * *